(12) United States Patent
Rahmfeld et al.

(10) Patent No.: US 12,013,850 B2
(45) Date of Patent: *Jun. 18, 2024

(54) METHOD AND SYSTEM FOR ADVANCED DATA CONVERSATIONS

(71) Applicant: Alation, Inc., Redwood City, CA (US)

(72) Inventors: Joachim Rahmfeld, Los Altos, CA (US); Jennifer Wu, Los Altos, CA (US)

(73) Assignee: Alation, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/344,887

(22) Filed: Jun. 10, 2021

(65) Prior Publication Data

US 2021/0390099 A1 Dec. 16, 2021

Related U.S. Application Data

(60) Provisional application No. 63/037,511, filed on Jun. 10, 2020.

(51) Int. Cl.
*G06F 16/2452* (2019.01)
*G06F 16/21* (2019.01)
(Continued)

(52) U.S. Cl.
CPC ...... *G06F 16/24522* (2019.01); *G06F 16/213* (2019.01); *G06F 16/243* (2019.01);
(Continued)

(58) Field of Classification Search
None
See application file for complete search history.

(56) References Cited

U.S. PATENT DOCUMENTS 8,996,555 B2 * 3/2015 Kuchmann-Beauger ................... G06F 16/248 707/763
10,210,267 B1 2/2019 Lloyd et al.
(Continued)

OTHER PUBLICATIONS

Zhong et al. "Seq2SQL: Generating Structured Queries from Natural Language Using Reinforcement Learning", Nov. 9, 2017, pp. 1-7 (Year: 2017).*

(Continued)

*Primary Examiner* — Matthew J Ellis
(74) *Attorney, Agent, or Firm* — Goodwin Procter LLP

(57) ABSTRACT

A method for querying and analyzing datasets via natural language processing (NLP) that can maintain context is disclosed. According to one embodiment, a computer-implemented method includes receiving, by a user interface, at least one of an utterance or a structured query language statement. The method includes identifying zero or more previous data conversation steps indicated by the utterance. The method includes determining, based on the utterance and the zero or more previous data conversation steps, an effective schema targeted by the utterance. The method includes generating, based on the utterance and the effective schema, an intermediate structured query language statement that is representative of the utterance. The method includes generating an executable structured query language statement based on the intermediate structured query language statement. The method includes executing the executable structured query language statement for the data query engine schema. The method includes communicating a result set and metadata.

20 Claims, 5 Drawing Sheets

(51) Int. Cl.
*G06F 16/242* (2019.01)
*G06F 16/26* (2019.01)
*G06F 16/28* (2019.01)
*G06F 40/284* (2020.01)
*G06F 40/30* (2020.01)

(52) U.S. Cl.
CPC ............ *G06F 16/26* (2019.01); *G06F 16/288* (2019.01); *G06F 40/284* (2020.01); *G06F 40/30* (2020.01)

(56) References Cited

U.S. PATENT DOCUMENTS

| | | | |
|---|---|---|---|
| 2005/0043940 A1* | 2/2005 | Elder | G06F 16/24522 704/9 |
| 2009/0192968 A1* | 7/2009 | Tunstall-Pedoe | G06N 5/022 706/53 |
| 2010/0228540 A1 | 9/2010 | Bennett | |
| 2017/0083569 A1 | 3/2017 | Boguraev et al. | |
| 2017/0242886 A1* | 8/2017 | Jolley | G06F 40/211 |
| 2017/0308571 A1 | 10/2017 | McCurley et al. | |
| 2018/0329918 A1 | 11/2018 | Hakkani-Tur et al. | |
| 2019/0095478 A1* | 3/2019 | Tankersley | G06F 11/3006 |
| 2021/0073336 A1* | 3/2021 | Fox | G06N 3/084 |
| 2021/0150398 A1* | 5/2021 | Bastide | G06N 7/01 |
| 2022/0067037 A1* | 3/2022 | Ranganathan | G06F 16/243 |

OTHER PUBLICATIONS

Dai, Zhuyun and Callen, Jamie, (2019), "Deeper Text Understanding for IR with Contextual Neural Language Modeling," <https://www.cs.cmu.edu/~callan/Papers/sigir19-Zhuyun-Dai.pdf>, (2019), 4 pages.

Devlin et al., "BERT: Pre-training of Deep Bidirectional Transformers for Language Understanding," cite arxiv:1810.04805, (2019), 16 pages.

He et al., "X-SQL: Reinforce Context Into Schema Representation," (2019), 8 pages, https://www.microsoft.com/en-us/research/uploads/prod/2019/03/X_SQL.pdf.

Herzig et al., "TAPAS: Weakly Supervised Table Parsing via Pre-training," arXiv:2004.02349v2 [cs.IR], (2020), 14 pages.

Lan et al., "ALBERT: a Lite Bert for Self-Supervised Learning of Language Representations," ICLR, arXiv:1909.11942v6 [cs.CL], (2020), 17 pages.

Nogueira et al., "Multi-Stage Document Ranking with BERT," arXiv:1910.14424v1 [cs.IR], (2019), 13 pages.

Wang et al., "RAT-SQL: Relation-Aware Schema Encoding and Linking for Text-to-SQL Parsers," arXiv:1911.04942v2 [cs.CL], (2020), 12 pages.

Yu et al., "CoSQL: a Conversational Text-to-SQL Challenge Towards Cross-Domain Natural Language Interfaces to Databases," arXiv:1909.05378v1 [cs.CL], (2019), 18 pages.

Yu et al., "Spider: a Large-Scale Human-Labeled Dataset for Complex and Cross-Domain Semantic Parsing and Text-to-SQL Task," arXiv:1809.08887v5 [cs.CL], (2019), 11 pages.

Zhang et al., "Editing-Based SQL Query Generation for Cross-Domain Context-Dependent Questions," arXiv:1909.00786v2 [cs.CL], (2019), 12 pages.

Zhong et al., "SEQ2SQL: Generating Structured Queries From Natural Language Using Reinforcement Learning," arXiv:1709.00103v7 [cs.CL], (2017), 12 pages.

"The Tableau Data Model", Version 2020.2, dated to Feb. 9, 2022, <https://help.tableau.com/v2020.2/pro/desktop/en-us/datasource_datamodel.htm#star-and-snowflake-schema-analysis>, retrieved on Mar. 31, 2023 from <http://web.archive.org/web/20220209113921/https://help.tableau.com/v2020.2/pro/desktop/en-us/datasource_datamodel.htm>, 11 pages.

International Search Report and Written Opinion for PCT/US2021/036877, dated Sep. 22, 2021.

Lin et al. "Grammar-based Neural Text-to-SQL Generation", arXiv:1905.13326v1 [cs.CL] May 30, 2019. Retrieved on Aug. 16, 2021. Retrieved from <URL:https://arxiv.org/pdf/1905.13326.pdf> entire document.

Screen captures from YouTube video entitled "Google Sheets Explorer," 4 pages, uploaded on Aug. 24, 2017 by user "suresh sood". Retrieved from Internet: <<https://www.youtube.com/watch?v=6uYIQ2hOx30>>.

Screen captures from YouTube video entitled "Tableau—Ask Data," 3 pages, uploaded on Feb. 15, 2019 by user "Cloudstream Partners". Retrieved from Internet: <https://www.youtube.com/watch?v=MV75N9eSnuo>>.

Sukthankar et al. "nQuery—a Natural Language Statement to SQL Query Generator", Proceedings of the 55th Annual Meeting of the Association for Computational Linguistics-Student Research Workshop, pp. 17-23, Aug. 4, 2017. Retrieved on Aug. 16, 2021. Retrieved from <URL: https://aclanthology.org/P17-3004.pdf> entire document.

\* cited by examiner

METHOD AND SYSTEM FOR ADVANCED DATA CONVERSATIONS

CROSS-REFERENCE TO RELATED APPLICATIONS

This application claims priority and benefit from U.S. Provisional Application No. 63/037,511, titled "Method And System For Advanced Data Conversations" and filed on Jun. 10, 2020, which is hereby incorporated by reference herein in its entirety.

TECHNICAL FIELD

The present disclosure relates generally to the data analytics field, and more specifically to systems and methods for querying and analyzing datasets via natural language processing (NLP).

BACKGROUND

Data analytics may be leveraged to maximize the value and utility of datasets, where datasets are conventionally stored among a number of computing systems (e.g., in databases, key-value stores, cloud object stores). Typically, such data analytics may be used by an individual or entity (e.g., a company) to broadly understand (i.e., explore) data sets and/or answer potentially complex questions (i.e., analyze data) in order to enhance decision making (e.g., for business decisions). However, current approaches to extract data insights are often challenging. Existing solutions frequently involve a combination of (i) leveraging relatively few specialized technical individuals in conjunction with the manual and time-consuming process of data manipulation in spreadsheets and/or (ii) using conventional tools and systems (e.g., that may include visualization/dashboard-centric offerings) that are too high-level and/or lack the flexibility to easily answer new and potentially complex data questions, perform custom data analyses, or allow custom data exploration e.g., by non-technical individuals. However, critical business stakeholders are often non-technical users who stand to benefit the most from being able to quickly perform broad data explorations and/or deep and meaningful data analyses. The present disclosure seeks to provide a new method and system for data conversations that enables both technical and non-technical users to intuitively, broadly explore data and build sophisticated data analyses in a robust and structured way using natural language.

Recently, there has been a steep acceleration in innovations with respect to AI/machine-learning-based approaches to Text-to-SQL translations. Most of such approaches address single question and answer pairs. Some research approaches discuss iterative connected questions but those are generally focused on carrying over filter conditions from previous questions.

To date, known efforts to commercialize Text-to-SQL translations are limited and primarily targeted as add-ons to existing analytics commercial offerings. For example, some visualization/dashboarding analytic tools have added a natural language interface to facilitate finding dimensions and measures to produce a standard graph or chart in response to a single, simple query.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

A method for querying, exploring, and analyzing datasets through natural language (and/or structured query language) data conversations between users and their data sets, implemented with context-based natural language processing (NLP) techniques and other artificial intelligence technology is disclosed. According to one embodiment, a computer-implemented method may include receiving, by a user interface, at least one of an utterance or a structured query language statement. The method may include identifying zero or more previous data conversation steps indicated by the utterance, wherein the zero or more previous data conversation steps comprise at least one of a previous utterance, a previous structured query language statement, a previous result set, or previous step metadata. The method may include determining, based on the utterance and the zero or more previous data conversation steps, an effective schema targeted by the utterance, wherein the effective schema comprises at least one of a topic schema from a data query engine schema or one or more columns of one or more previous result sets. The method may include generating, based on the utterance and the effective schema, an intermediate structured query language statement that is representative of the utterance. The method may include generating an executable structured query language statement based on the intermediate structured query language statement and the zero or more previous structured query language statements of the zero or more previous data conversation steps, wherein the executable structured query language query is comprised of a query language dialect of a data query engine. The method may include executing the executable structured query language statement for the data query engine schema. The method may include communicating, via the user interface, a result set and metadata, wherein the result set and the metadata correspond to executing the executable structured query language statement, wherein the metadata comprises detailed interpretable information of the executed structured query language query.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1A:
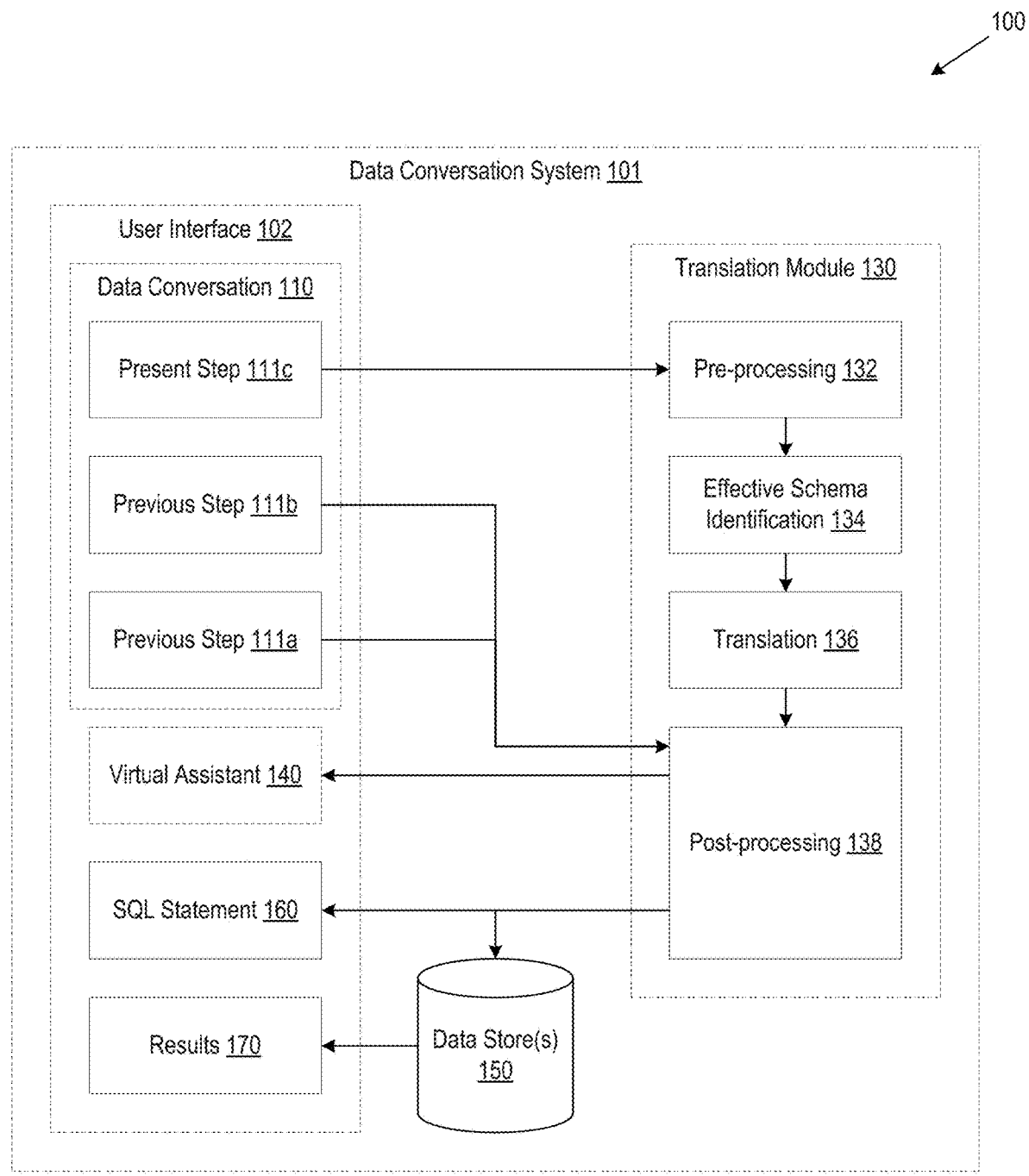
FIG. 1A illustrates an exemplary workflow for a natural language (NL) query at an exemplary data conversation system, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

A method for querying, exploring, and analyzing datasets through natural language (and/or structured query language) data conversations between users and their data sets, implemented with context-based natural language processing (NLP) techniques and other artificial intelligence technology is disclosed.

System Overview

In some embodiments, a data conversation system can avoid the limitations of conventional analytics tools and workflows by enabling users to easily and meaningfully query, explore, and analyze datasets using data conversations expressed in natural language (NL) (e.g., English language). Via data conversations, users may derive data insights (e.g., find data correlations, answer business questions, analyze data outliers, etc.) from datasets and subsequently leverage the acquired data insights to drive decision making. Further, the ability to use natural language (versus technical query languages such as SQL) as a medium to interact with datasets may enable a broader class of users to interact with datasets in order to discover data insights and/or extract deeper data insights (e.g., to drive business decisions) more quickly and intuitively.

A data conversation may contain a series of one or more data conversation steps that operate within a conversational context. A data conversation step may contain one or more utterances (i.e., natural language queries) and/or one or more structured query language (e.g., SQL) queries directed at one or more datasets. If a data conversation step starts with an utterance (versus a structured query language query), then the utterance is first translated by the data conversation system into a structured query language query. The (translated or directly submitted) structured query language query is executed against the targeted one or more data sets which produces a data result set and metadata for a given data conversation step. The end product of a data conversation may be new data insights from and/or a broader understanding of the data included in the one or more datasets.

Accordingly, rather than the use of single queries to analyze datasets (which may be cumbersome (i.e., difficult to author and hard to maintain) and/or imprecise due to language complexities (i.e., difficult to accurately translate), the present system enables a user to build complex data analyses using a modular approach that allows new utterances to leverage previous conversation steps (including e.g., utterances, structured query language queries, and result set data) of a data conversation. In some cases, results from previous conversation steps may be used as a filter or target of a subsequent utterance.

Users may derive insights from one or more data sources through data conversations with their dataset(s), facilitated by the data conversation system's data visualization capabilities for data result sets and feedback and recommendations of a virtual assistant. The present system may interactively provide feedback and recommendations regarding a specific utterance, structured query language query, and/or result set within a data conversation (e.g., via a virtual assistant). This feedback may, for example, highlight ambiguities and/or errors in utterances, allow a user to understand whether an utterance was interpreted as intended, and/or facilitate the user in providing another utterance.

In some embodiments, the present system may include a user interface, such that data conversations and resulting data insights may be shared by users. Users may review, replay, modify, and build on top of data conversations saved by other users. Users may collaborate on data explorations and analyses by collectively building, editing, and annotating shared data conversations. Technical users (e.g., data analysts) may be able to review, replay, modify, and/or augment existing data conversations shared by other users (e.g., business users), which may further improve and accelerate collaboration.

The user interface may include topic views of the system accessible schemas and predefined custom calculations in order for users to more easily view and understand the scope and relationships of the queryable data. The topic view may be particularly useful for non-technical users who are unfamiliar with the layout of the data. The topic view may also be particularly useful in situations where a data query engine (e.g., a data warehouse) hosts disparate datasets and/or in situations where a data query engine has a very large number of tables and/or table columns, as described herein. The topic view may comprise a listing of one or more topics, wherein each topic of the one or more topics comprises one or more columns and their respective tables, respective join conditions and other metadata. Further, the queryable attributes of a topic are logically arranged and/or categorized based on entity (i.e., data table) associations and the meaning and/or usage of those attributes. The topic view may display topics, entities, and attributes with human understandable aliases.

In some embodiments, as described herein, the present system may receive utterances from users as a part of one or more data conversations. The present system may include grammar extensions, such that the system may support utterances of greater breadth and variety compared to conventional systems. The present system may convert such utterances from natural language statements (that include questioning variations found in natural language) to structured query language (e.g., SQL) statements. Such query conversions may occur via one or more machine learning models that may i) determine which (subset of a) schema should be included in a translation task for a given utterance, t ii) identify whether and how elements from previous data conversation steps may be incorporated into the query, and iii) translate the utterance.

The present system may query data query engines (e.g., databases) that support structured query languages (e.g., SQL) using the translated utterances from the system and/or directly submitted structured query language queries. A response of the present system to a user submitted utterance/query may include, for example, the executable structured query language (e.g., SQL) query, the results of the execution of the structured query language (e.g., SQL) query, and virtual assistant information. By implementing an adaptable translation module, the present system may interface with different query engines that may support different query language (e.g., SQL) dialects.

The present system may define an intermediate structured query language (e.g., SQL-like language) that is able to compactly represent the broad and complex functionality of the targeted structured query language (e.g., SQL) and structured query language extensions (i.e., extensions that can incorporate operations on and/or queries against one or more elements of one or more previous data conversation steps) such that language translation from natural language to a targeted structured query language becomes a tractable task for a neural net model. Further, the present system may access sensitive data stored in one or more datasets, and the translation model of the present system may have been trained on sensitive information from multiple customers. In order to avoid spilling sensitive information from one customer to another, the present system may construct intermediate structured query language (e.g., SQL-like) statements (from which the final executable structured query language (e.g., SQL) statements may be derived) representing an utterance exclusively out of three components that are typically not sensitive in nature. These three components may include: i) tokens in the utterance of the user, ii) information specific to the schema of interest (e.g., column names, join conditions etc.) and/or columns derived from previous result sets in the current data conversation, and iii) specified (e.g., SQL) keywords. (An intermediate structured query language statement may be subject to further post-processing to generate the executable structured query language (e.g., SQL) statement.) Therefore, by construction, the translation model may be restricted from generating queries (e.g., SQL statements) that may reveal sensitive data from a different customer or user.

System Architecture

In some embodiments, the data conversation system can include one or more components to enable data query, exploration, and analysis via natural language data conversations. The data conversation system may include one or more computing devices and one or more networks as described herein (See "General Comments"). In some cases, the data conversation system may include a user interface. In some cases, the user interface may include a graphical user interface displayed via one or more display devices. In some cases, the user interface may include an audio user interface including one or more microphone devices and/or speaker devices. In some cases, the user interface may include a programmatic interface (e.g., a Python API). In some cases, the user interface may include a schema (e.g., data tables and columns) view of the system-accessible data. The schema view may indicate the data structures that may be queryable via natural language. In such cases, the schema view may include indicators that show which columns of a dataset are recognized by a translation module as to be described herein, such that a user may better understand which type of questions to ask (e.g., via one or more utterances) for a given dataset.

In some embodiments, the user interface may include a topic view. The topic view may differ from other conventional schema presentation techniques (e.g., a schema view or entity relationship diagram). The topic view may be a graphical user interface that includes a logical, language-centric representation of the underlying database structure that can be queried via the present system (e.g., using an utterance), such that the meaning of and relationships between queryable attributes may be easily understood and thus can guide the questions of the user.

The topic view may include one or more topics, where each topic may contain one or more entities which may be described by one or more entity attributes. To easily find and understand available attributes, the attributes may be logically grouped into common categories. For example, attribute categories may include: 'Identifiers', 'Quantities', 'Dates', etc. Topic view objects may relate to data query engine schemas as follows:

An entity may often map to a table in the schema, but an entity may also be constructed from joined tables if there is a 1:1 mapping between rows of the tables. As an example, consider a table that describes (unique) customer accounts with various customer attributes where one attribute may be 'region'. Consider then another table that describes regions with various region attributes, where one attribute may be 'country'. In the topic view, 'country' could then be transitively displayed as an attribute for an entity 'accounts'. As compared with the schema view, the 'country' information would be separated from the accounts table.

A queryable attribute may be a column of a table in the schema which can map to table data or a predefined custom calculation definition. As an example of the latter case, "age" may be a custom calculation with a predefined SQL calculation defined as 'LEAST(current_date, close_date)−create_date'.

Multiple entities can be grouped within a topic. The tables supporting such entities should have well-defined join conditions.

A topic may be a subset of the underlying database schema.

In some cases, data may have originated from multiple data sources and been loaded into a data query engine (e.g., data warehouse), where data sources may not be joinable. In some cases, a data schema might have hundreds or thousands of columns (i.e. attributes) across many tables (i.e. entities) that are unrelated (or lack relevant relation). For such cases, it may be practical to group related entities and their attributes into different topics. As an example, a first topic may include sales-related entities, while a second topic may include product usage-entities, with both topics visible in a topic view and queryable via one or more data conversations. Given the multiple possible disparate, queryable data sets, the effective schema identification layer 134 described herein may need to identify, for each submitted utterance, the topic(s) and/or result set(s) from previous conversation step(s) that may likely contain the answer for the utterance.

The conversational approach of the present system may allow a new utterance to use (e.g., connect, operate, combine, relate, or analyze) result set data from multiple previous queries in a conversation which were executed against different topics that may map to either joined or unjoined data tables. Accordingly, through the conversational approach, data analysis may occur across either joined or unjoined datasets.

The data conversation system may have a translation module with a natural language interface that enables a user to interact with datasets via natural language (e.g., English language) data conversations. In some cases, the translation module may include advanced data conversation capabilities that may include support for wide variation in natural language expression and a broad scope in the targeted structured query language function. Accordingly, utterances in a data conversation may be linguistically fluid, such that the utterances may need to include no (or few) reserved (i.e., special signaling) words. As a result, utterances may be intuitively expressed and may be converted to predictable and/or repeatable data operations and/or queries. Further, a new utterance in a data conversation may use previous queries and their corresponding results as context, thereby employing a modular approach to build increasingly complex data flows. The translation module may convert received utterances to one or more executable structured query language statements as described herein, wherein the structured query language statements may be executed against one or more datasets stored by one or more data stores and/or one or more previous result sets of the data conversation.

In some embodiments, the translation module may include one or more subcomponents. The one or more subcomponents may translate an utterance of a data conversation into one or more structured query language (e.g., SQL) statements. In some cases, the translation module may include an effective schema identification component. The effective schema identification component may identify a topic and/or one or more referenced steps of a data conversation that should serve as the target(s) for a utterance. In some cases, the effective schema identification component may use a machine learning model to make this prediction from the received utterance and the metadata of i) the one or more topics (which may be the columns corresponding to their attributes) and ii) the column names of the result sets of the referenced conversation steps. For example, the effective schema identification component may determine that the current utterance references the first utterance that was submitted and executed in the data conversation, so that the current utterance is directed to operate on the result set associated with the first utterance. Translating utterances directed at a previous result set may be implemented using Common Table Expressions which are available in many database systems (see post-processing described herein).

In some embodiments, the one or more subcomponents of the translation module may include a natural language (NL) translation component. The NL translation component may translate an utterance into one or more intermediate structured query language (e.g., SQL) statements. The intermediate structured query language statements may be based on a SQL-like grammar that extends standard SQL grammar to work in the data conversation context discussed herein. The intermediate structured query language may be defined such that the translation model can tractably support: (i) utterance translations to complex structured query language statements (e.g., SQL windowing operations), (ii) colloquial utterances that may map to structured query language statements that may contain multiple sub-queries (e.g., year-over-year growth), (iii) manipulation of, calculations on, and reuse of previous queries and their result sets in the data conversation context, (iv) varying structured query languages and/or dialects implemented by different data query engines.

In some embodiments, the one or more subcomponents of the translation module may include a post-processing component. The post-processing component may receive the intermediate structured query language statements from the NL translation component. Based on the received intermediate structured query language statements, the post-processing component may convert the intermediate structured query language statements to one or more executable structured query language statements. The executable structured query language statements may interface with the specific data query engine (e.g., database) and/or previous result set(s) that were the subjects of the received utterance.

In some embodiments, the data conversation system may include a virtual assistant. In some cases, the virtual assistant may be included in the user interface. In some cases, the virtual assistant may be accessible via a programmatic interface. In some cases, the virtual assistant may provide feedback that helps the user to validate that the generated executable structured query language query from the translation module accurately reflects the intent of the user who submitted the utterance. In some cases, the virtual assistant may give the user feedback from the data conversation system in order to facilitate producing the next utterance in the data conversation. The virtual assistant may receive and/or communicate (e.g., display) for a given utterance: an indication of the confidence level of the NL translation; an explanation of the translated executable structured query language statement in understandable terms (e.g., to a non-technical user); additional post-processing steps that were taken to process the intermediate structured query language statement; the result set(s) produced by the execution of the structured query language statement; and the data filters used in the execution of the query.

As an example, the virtual assistant may display the following feedback:
Queried: Topic 1
Ranking operation:
Segmented by region
Ranked by sum_amount in descending order per segment
Showing up to 2 first values per segment
Base data filters:
stage='won'
Confidence: medium In some embodiments, the data conversation system may include a conversation history window. In some cases, the conversation history window may be displayed in the user interface. A conversation history window may be available for one or more data conversations, including replayed and/or present data conversations that each include zero or more conversation steps. Further, the conversation window may have responses, feedback, and/or recommendations by the virtual assistant that may be specific for each executed utterance. In some cases, the conversation window may include a hyperlink associated with each conversation step, where the hyperlinks may allow fast navigation to any step of a data conversation by automatically scrolling to the results and details of a selected conversation step. This is different from conventional analytics notebooks which have no workflow to navigate to specific cells in a notebook.

In some embodiments, the data conversation system may include a retraining module. Retraining the translation model in the module may ensure that a particular utterance will generate a specific, desired translated structured query language query in future translation requests for that utterance. The retraining module may enable a translation model retraining workflow based on a user indicating that a specific utterance was not translated by the data conversation system as intended by the user. In some cases, the user may submit a mistranslated utterance and user comment to the data conversation system via the graphical user interface. In some cases, the user may submit a mistranslated utterance and user comment to the data conversation system via a programmatic interface. The retraining model may retrain the model based on the received information for the user submitted utterance.

In some embodiments, the data conversation system may include a collaboration module that enables sharing of data conversations between users or groups of users. The collaboration module may be accessible via a programmatic interface of the data conversation system. The collaboration module may be accessible via the user interface of the data conversation system. The collaboration module may present a user workflow to save, annotate, edit, and/or replay one or more data conversations. Data conversations may be shared and/or repeatedly accessed for the purposes of (i) acting as a starting point for further data analysis; (ii) reviewing and/or editing the analyses generated by other users; (iii) sharing data insight results with other stakeholders; and (iv) monitoring data trends in a manner similar to dashboards (e.g., saving and replaying a series of graphs with up-to-date data). In some cases, technical users (e.g., data analysts) may manually correct/edit/supplement data conversations, for example, by replaying a shared conversation and editing relevant generated structured query language statement(s) in order to achieve a result intended by a user or users that created the data conversation.

Translation Module Workflow in a Data Conversation System

In some embodiments, the data conversation system may include the capability to translate an utterance (e.g., received from a user input) within a data conversation context into structured query language (e.g., SQL) queries via the translation module 130. In some cases, a user may input a structured query language query directly into the data conversation system (e.g., via the user interface), but typically, a user will input an utterance within the context of a data conversation, where the utterance may be parsed, translated to an executable structured query language statement, and executed against the relevant data sets by the data conversation system. FIG. 1A illustrates an exemplary workflow 100 for an utterance at an exemplary data conversation system 101, according to some embodiments. The workflow 100 may include one or more components of the data conversation system 101 as described herein. For example, as shown in FIG. 1A, the workflow 100 may include the user interface 102, the translation module 130, and the virtual assistant 140. In an example, the user interface 102 may be accessed and/or otherwise displayed via a web browser. In some cases, the user interface 102 may display one or more data conversations 110. In some cases, a data conversation 110 may include one or more conversation steps 111 (i.e. conversation steps 111), where each step 111 may include an utterance, a (translated or directly submitted user) structured query language query, a result set from query execution, and associated step metadata (e.g., a step name, a step number, virtual assistant feedback, user annotations, etc.). The one or more steps 111 may include one or more previous steps (e.g., previous steps 111a and 111b) and/or present steps (e.g., present step 111c). For example, as shown in FIG. 1A, the data conversation 110 may include previous steps 111a and 111b and present step 111c. A previous step may include an utterance (i.e. NL query), an executable structured query language statement generated based on the utterance (or input by a user), results corresponding to the execution of the structured query language statement, and the associated step metadata. A present step may include an utterance and/or a structured query language statement input by a user. In some cases, steps 111 may be displayed via the user interface 102 as a part of a data conversation 110. In some cases, steps 111 may be accessed and/or otherwise used by the translation module 130. For example, a structured query language statement associated with the previous step 111b may be used by a post-processing layer 138 as to be described herein.

As described herein, the data available for query by a user may be presented via a schema view or a topic view in the user interface 102. In some embodiments, the workflow 100 may begin with a data conversation present step 111c, where the present step 111c may include an utterance (or a structured query language statement). A user may input an utterance at the user interface 102 (e.g., via a web browser or a microphone). A user may also input an executable structured query language statement in place of an utterance. In some cases, an utterance of the present step 111c may be displayed along with the data conversation 110 in a conversation history window in the user interface 110. A translated utterance may be executed against the relevant data sets (e.g., at data store(s) 150) by the data conversation system 101.

In some embodiments, the utterance (i.e., NL query) originating from the present step 111c may be communicated and/or otherwise input to the translation module 130. The translation module 130 may include one or more layers. The one or more layers may be mapped to the components of the data conversation system as described herein. In some cases, in the workflow 100, the translation module 130 may execute pre-processing of the utterance included in the present step 111c at the pre-processing layer 132. In some cases, the pre-processing layer 132 may determine whether the utterance includes one or more references to previous steps 111 (e.g., previous step 111a or 111b) included in the data conversation 110. In some cases, the pre-processing layer 132 may remove one or more unnecessary tokens (e.g., words) from the utterance and/or identify higher-level actions indicated by keyword(s) included in the utterance as to be described herein. Based on the operation of the pre-processing layer 132, the workflow 100 may proceed to an effective schema identification layer 134, where the translation module 130 may execute schema identification for the utterance. The effective schema identification layer 134 may determine the topic (e.g., mapped to a group of tables and columns of the underlying schema in the data store(s) 150) and/or the result set(s) from previous steps (e.g., previous steps 111a and/or 111b) on which to operate, query, or use. If one or more result sets from one or more previous steps are selected as data sources for the utterance, the effective schema identification layer 134 may determine the column(s) and/or table(s) in the referenced previous step results to be encoded as (part or all of) the effective schema for the utterance. If a topic is selected as a data source for the utterance, the effective schema identification layer 134 may determine the schema information corresponding to the topic from the schema encoding, which may be a configuration in the data conversation system 101 that represents the underlying schema as described herein.

In some embodiments, based on the operations of the effective schema identification layer 134, the workflow 100 may proceed to the translation layer 136. In some cases, the translation layer 136 may determine a prediction of the received utterance in the intermediate structured query language format. The translation layer 136 may determine the prediction based on translating and/or otherwise converting the processed utterance (e.g., from the preprocessing layer 132), (e.g., SQL) keyword(s) (e.g., from the pre-processing layer 132), and effective schema (e.g., from the effective schema identification layer 134) to an intermediate structured query language statement having characteristics as described herein. In some cases, the translation layer 136 may determine an estimated confidence level of the translation, which can be based on the aggregated and/or individual token probabilities that are generated by the translation layer 136. Such an estimation may be displayed in the user interface 102 (e.g., via a virtual assistant 140).

In some embodiments, based on the operations of the translation layer 136, the workflow 100 may proceed to the post-processing layer 138, where the translation module 130 may generate an executable structured query language statement based on the intermediate structured query language statement (e.g., from the translation layer 136) and generate feedback for display by a virtual assistant 140. In some cases, the post-processing layer 138 may include operations involving derivation and insertion of From/Join and/or Group-By expressions in the executable structured query language statement as described herein (See "Post-processing Layer"). The post-processing layer 138 may adjust formatting of the intermediate structured query language statement and/or the executable structured query language statement based on the specific database types of the schemas that are the targets of the executable structured query language statement(s). To generate the executable structured query language statement(s), the translation module 130 may assemble structured query language statement(s) using one or more previous structured query language statements (e.g., from previous step(s) 111*a* and/or 111*b*) as subcomponents. Such assembly may occur using Common Table Expressions as to be described herein (See "Intermediate SQL" and "Post-Processing" sections). In some cases, an action included in the intermediate structured query language statement may not be supported by the targeted database. In such a case, the post-processing layer 138 may generate feedback, where the feedback may describe that an error has occurred. The feedback may further describe the contents of the error and the action that resulted in the error. The feedback may be displayed at the user interface 102 (e.g., via the virtual assistant 140).

In some cases, based on the prediction probabilities of the translation layer 136 the post-processing layer 138 may create an aggregated confidence measure for the translation of the utterance of the present step 111*c* (if applicable). The post-processing layer 138 may summarize the executable structured query language statement in human-understandable terms (e.g., for a non-technical user), such that a user may understand the translation of their utterance. The confidence analysis by the translation module 130 and human-understandable summarization may be communicated to the virtual assistant 140 for display at the user interface 102.

In some embodiments, based on the operations of the post-processing layer 138, the data conversation system 101 may display the resulting executable structured query language statement 160 at the user interface 102. The structured query language statement 160 may be included with utterance of the present step 111*c*. In some cases, the data conversation system 101 may execute the structured query language statement 160 provided by the post-processing layer 138 against the underlying database schema (e.g., at the data store(s) 150).

Figure 1B:
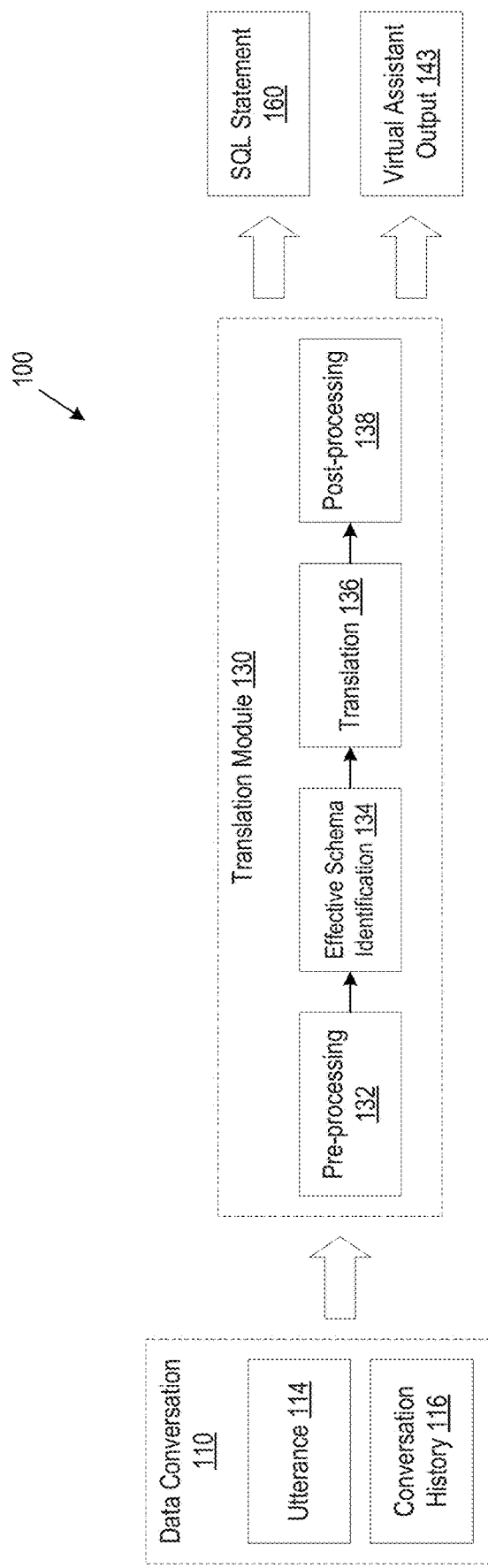
FIG. 1B illustrates an exemplary workflow for a natural language (NL) query at an exemplary data conversation system, according to some embodiments.

The data conversation system 101 may display the results 170 from the execution of the structured query language statement 160 at the user interface 102. The results 170 may be included with the utterance of the present step 111*c*. In some cases, the results 170 may be displayed with graphing options, data table views, relevant data filters, and/or an annotation capability. In some cases, the data conversation system 101 may display the virtual assistant feedback (e.g., as shown in FIG. 1B) generated by the post-processing layer 138. As described herein, the virtual assistant feedback may include a confidence level (e.g., numerical or categorical) for the utterance translation by the translation module 130 and an indication of whether a previous step (e.g., previous step 111*a* or 111*b*) in the data conversation 110 was queried based on the present step 111*c*. In some cases, the virtual assistant feedback may include a human-readable explanation of the translated structured query language statement 160 in understandable terms (e.g., for a non-technical user). As described herein, the data conversation system 101 may include a retraining module and/or a collaboration module (not shown).

Advanced Context Propagation

In some embodiments, to arrive at a data insight from the data analysis of a workflow (e.g., workflow 100), a user may need to consider and combine results from various sub-steps, as well as perform consequent determinations (e.g., questions, calculations, etc.). The advanced context propagation concept of the data conversation system 101 may enable meaningful data analysis and exploration through the generation of complex queries that are built on top of multiple, previously executed steps. As an example, the present step 111*c* may be directed to the results of the previous steps 111*a* and 111*b*.

In some embodiments, as an example, a user may desire an answer to the following question: "Which of our existing customers do not have any open sales opportunities in the pipeline?", where the schema may contain tables that contain customer and sales information. To answer such a question, an example data conversation may include three steps to answer the above business question. For reference purposes, an utterance from a user may be described in quotations below, while step names may be indicated by an arrow adjacent to each utterance:

Step 1: "Which accounts have at least one won opportunity?"→customers

Step 2: "Show me the accounts that have open opportunities."→accounts with potential opportunities Step 3: "Show me the data from {customers} that are not in {accounts with potential opportunities}"→customers with opportunities As described above, it may be challenging for a system that lacks data conversations and the use of context to support answering the above business question, as the system would lack context propagation. Depending on the underlying structure of the data, this may involve multiple queries of different query types, and a model may not be able to generate an entire representative query sequence for a question of this complexity. Also, the iterative validation of intermediate results from multiple steps while forming the data analysis may be far simpler than validating the results of one large statement.

To enable functionality as laid out above, a conversation step needs to be able to refer back to earlier steps and the data conversation system 101 needs to be able to identify the intent of how the referenced steps are to be used in the current utterance in present step 111c. In some embodiments, the example possibilities of the intent may be to use a referenced step as a filter for a query, or to perform a new query on the result ret of a referenced query, or to join referenced steps, or to find data in the result set of one referenced step that is missing in the result set of another referenced step.

User intents that operate on referenced previous steps may be examples of what can be referred to as higher-level actions: user intents that may not directly map to immediate standard SQL keywords, but which may require extensive post-processing to express in SQL. In some cases, the data conversation system 101 may support context-based higher-level actions. In an example, context based higher-level actions may also include utterances such as drop column or rename column. Through use of NL to SQL statement translations and higher-level actions, the data conversation system 101 may support a wide breadth of language and problem coverage that may be applied for industry data analysis and exploration use cases.

Translation Workflow

In some embodiments, as described herein, the translation module 130 may enable a data conversational experience that supports complex data analysis through application of broad language support for both NL (e.g., English) and structured query language (e.g., SQL) queries. Utterances (e.g., utterance 114) that are input to the translation module 130 may be grammatically broad and generally unconstrained, allowing for fluid linguistic expression of questions and parsable data analyses.

In some embodiments, the translation module 130 may allow for usage of custom mathematical calculations, where the calculations may be pre-defined or part of a user query (e.g., ad-hoc calculations). The translation module 130 may allow for usage of commonly derived quantities. As an example, a commonly derived quantity may be the growth of a certain metric. In some cases, the translation module 130 may allow present time utterances to operate using previous results, such that previous results may be combined and/or manipulated. The translation module 130 may allow for exclusion of result sets from other result sets, pivot table, naming of columns, and/or dropping of columns. FIG. 1B illustrates an exemplary workflow 100 for a natural language (NL) query at a data conversation system 101, according to some embodiments. In some cases, the translation module 130 may receive an utterance 114 (e.g., from step 111c) from an ongoing data conversation 110 as an input. The utterance 114 may include one or more SQL keywords defined by the translation module, resulting in an intermediate SQL statement corresponding to the SQL keywords. The utterance 114 may include schema encoding for the translation module 130 through reference to previous results (e.g., included in a conversation history 110) The data conversation 110 may include a conversation history 116, which may include previous steps (e.g., previous steps 111a and 111b) as described herein. In the translation layer 130, the utterance 114 may be processed from an NL format by a pre-processing layer 132, an effective schema identification layer 134, a translation layer 136, and a post-processing layer 138. In some cases, the translation module 130 may output a SQL statement 160 as described herein. In some cases, the translation module 130 may generate a virtual assistant output 143 (e.g., at the virtual assistant 140) as described herein.

Schema Encoding

In some embodiments, the schemas in the data store(s) 150 may be encoded by the data conversation system 101 for reference by the translation module 130. In some embodiments, the schema encodings may be stored in configuration files or in a separate database system. In some cases, encodings may include (a subset or all) schema columns, custom calculations, join-conditions, private/foreign key relationships, and more. In some cases, a column may be identified by a table name and column name, e.g., "<table>.<column name>". A column may be encoded to include a corresponding 'model name' and/or a format. This model name of the column may indicate the meaning of the column, and it may also be used by the translation model 130 to represent the column. A format may indicate a data type for the column which can be useful for correct post-processing in layer 138.

In some cases, a column encoding may include a preferred name for how the column in the result set should be displayed. For example, should the column 'accounts.id' be associated with a preferred renaming-name 'account_id', then the post-processing layer 138 may replace a "SELECT accounts.id, . . . " in the intermediate SQL-like statement with "SELECT accounts.id AS account_id, . . . ".

In some embodiments, custom calculations may be pre-defined and stored as a custom column in the schema encoding. In this case, the corresponding structured query language (e.g., SQL) calculation and the model name that the custom column represents need to be specified. For example, a custom calculation may be defined and stored in a schema encoding as follows: column: '_custom_age'
    model name: 'age'
    definition: "(LEAST(to_date(opportunities.close_date, \'YYYY-MM-DD\'), NOW::DATE)–to_date(opportunities.create_date, \'YYYY-MM-DD\'))"

In some cases, private and/or foreign key relationships may be defined in the schema encoding leveraged by the translation module 130. By referring to these private and/or foreign key relationships, the post-processing layer 138 may for example prevent double-counting of data values. As an example, if an account table is joined to an opportunities table where each account could map to multiple opportunities (with an attribute 'stage'), the translation of an utterance like "how many accounts have opportunities in stage 6" will require a 'DISTINCT' SQL keyword. Private/foreign key relationships may help to identify these situations.

In some cases, join-conditions may be defined in the schema encoding. Pre-defining the join-conditions may be required to construct the JOIN clauses for the SQL statements. The join-conditions may be configured by an administrator of the data conversation system 101 based on the guidance of the user's database administrator. In some cases, the schema encoding may define language substitutions that could be applied in the pre-processing phase 132. As an example, if the shorthand word 'opps' is sometimes used by non-technical users when they refer to opportunities, it may be advantageous to make this substitution during pre-processing 132. In some cases, the schema encoding may also contain substitutions to be applied during post-processing 138.

The topics may be defined in the schema encoding and the schema columns and their associated tables may be assigned to each topic.

In some cases, the schema encoding may contain language substitutions that could be applied in the pre-processing phase 132. As an example, if the shorthand word opps' is sometimes used by non-technical users when they refer to opportunities, it may be advantageous to make this substitution during pre-processing 132.

In some cases, the schema encoding may also contain substitutions to be applied during post-processing 138. In some embodiments, examples could include:
- specifying columns for which any "WHERE <column>='<value>'" should be commuted to a "WHERE <column> LIKE'%<value>%'" condition to avoid having to specify exact values
- specifying which columns should always be displayed with SELECT columns, e.g., it may be preferred to having a column accounts.id when selected also always show the column accounts.name Pre-Processing Layer In some embodiments, as described herein, the translation module 130 may include a pre-processing layer 132 configured to prepare user input(s) and utterance context for input subsequent layers of the translation model 130. As to be described herein, an intermediate SQL statement may be generated only from utterance tokens, schema columns, and SQL keywords (e.g., for security purposes). However, a mismatch may result between the terms expressed in an utterance by a user and the actual values stored in the database (e.g., by the data store(s) 150), and/or the names of schema columns. To accommodate for mismatches, the pre-processing layer 132 may execute pre-defined language substitutions. In a language substitution, the pre-processing layer 132 may substitute common and predictable language terms for terms that may be more meaningful in a given database context. As an example, a database may include a state column which stores the values for US states in abbreviated form such as "CA" and "TX", a column that contains the sales opportunity amount, and a column that captures the sales opportunity stage with values such as "won" and "lost". A user may input the utterance, "What are the total sales in California?" Accordingly, when parsing the utterance, the pre-processing layer 132 may substitute "California" for "CA" and "sales" for "won amount" as included in the database. Because the substituted terms correspond to database values, the pre-processing layer 132 may facilitate the translation of the utterance to an intermediate SQL statement. Such term substitutions may be a part of schema encoding as to be described herein (See "Schema Encoding").

In some cases, an utterance 114 may include a custom calculation, which may enable users to perform complex mathematical operations on a dataset based on a capability for the mathematical operations to be expressed in a SQL phrase. In some cases, a custom calculation may be pre-defined according to the schema encoding as to be described herein. As an example, if the achievement_ratio were pre-defined on the schema encoding as a custom column as described in the schema encoding, then an equivalent pre-defined custom calculation may be calculated by inputting the following utterance: "What is the achievement ratio per account rep? In other cases, a custom calculation may be applied to an utterance 114 in ad-hoc form by a user. As an example, an ad-hoc custom calculation may be defined to determine an achievement ratio for each account representative of a group of account representatives. The ad-hoc custom calculation may be calculated by inputting the following utterance: "What is the [sum_amount/sum_quota as achievement_ratio] per account representative in Step 3?"" Accordingly, the pre-processing layer 132 may extract the mathematical operations indicated by an ad-hoc custom calculation. To extract an ad-hoc calculation, the pre-processing layer 132 may extract the calculation and the metric name from the utterance 114 based on a pre-defined format (e.g., [<calculation> as <metric name>]) and replace the expression in the utterance 114 with the metric name. The pre-processing layer 132 may subsequently add a custom column that includes that custom calculation to the effective schema corresponding to the utterance 114 to complete extraction of the ad-hoc calculation. See the discussion below regarding how the effective schema is constructed.

Effective Schema Identification Layer

In some embodiments, the effective schema identification layer 134 of the translation module 130 may perform the operations identifying the appropriate topic or a referenced step that includes an answer for the utterance as described herein. The columns configured for the topic and corresponding meta-data, or the columns of the result set of the referenced step respectively, may constitute the effective schema. In some embodiments, if the pre-processing had identified a custom calculation request, a custom column representing that custom expression may be added to the effective schema. The effective schema may be used along with the utterance 114 and the intermediate SQL tokens by the translation layer 136 to construct the intermediate SQL statement as discussed below.

The effective schema identification layer 134 may use explicit and implicit methods to determine the effective schema. In some cases, the effective schema identification layer 134 may attempt to determine effective schema explicitly by determining whether an utterance includes a specified keyword (e.g., like "Using"). As an example, an utterance may be "Using Topic 1, what is the average . . . ", where "Using" is included by a user utterance and may be identified by the effective schema identification layer 134. Based on the keyword, the effective schema identification layer 134 may identify columns associated with "Topic 1" as the effective schema for the utterance. In some embodiments, other keywords may be configured to be identified by the effective schema identification layer 134 to trigger specific actions. Such an explicit effective schema identification technique may allow a user to directly force topic selection (or override topic selection by the effective schema identification layer 134).

Figure 2:
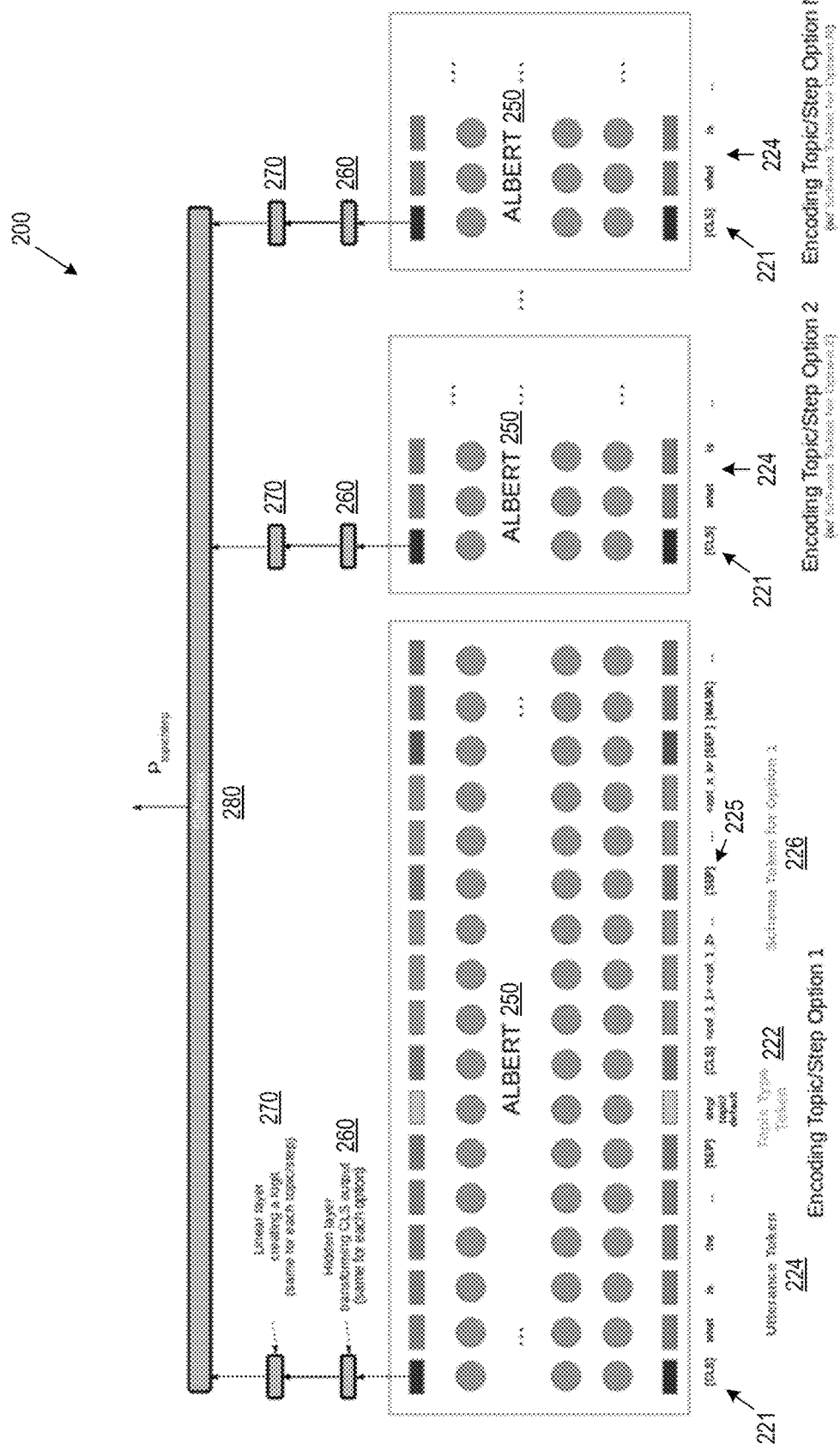
FIG. 2 illustrates an exemplary effective schema identification layer comprising an exemplary selection model, according to some embodiments.

In some embodiments, if no keywords were used that determine the effective schema, the effective schema identification layer 134 may determine the effective schema using a machine learning prediction model. FIG. 2 illustrates an exemplary effective schema identification layer 134 comprising an exemplary selection model 200, according to some embodiments. In some cases, the selection model 200 may determine effective schema corresponding to an utterance. The selection model 200 may generate one utterance-schema pairs for each topic and each referenced step, where each pair includes the utterance 114 and one effective schema option. The selection model may generate N utterance-schema pairs based on N number of effective schema options.

Each utterance-schema pair may be encoded with a context-based embedding model. In some cases, as shown in FIG. 2, the context-based embedding model may be an ALBERT model 250. The functionality of the ALBERT model 250 is described in "ALBERT: A LITE BERT FOR SELF-SUPERVISED LEARNING OF LANGUAGE REPRESENTATIONS". The layers of the ALBERT model 250 may be represented by the circles in FIG. 2.

In some embodiments, the utterance-schema pairs are tokenized by the ALBERT tokenizer to create input tokens for the ALBERT model. The structure of the input tokens shown in FIG. 2 may be as follows:

[CLS] utterance token [SEP] step/topic [CLS] column tokens (columns separated by [SEP])

As shown above and in FIG. 2, in some embodiments, the input tokens may include a starting [CLS] token 221, followed by the utterance tokens 224, followed by a separator token 225 [SEP], followed by the topic type token 222 which may be either the keyword 'topic' or 'step', followed by another [CLS] token, and then followed by the schema tokens 226. In some cases, padding may be applied, where a number of [PAD] tokens are added to ensure equal length of all tokenized pairs.

The purpose of the topic type token 222 may be to inform the model whether a specific set of columns is part of a topic or a referenced step. As these are distinctly different in terms of how they may be explicitly or implicitly referred to in the utterance 114 it may be beneficiary to use this feature as part of the input.

As tokenization of the column names may create multiple tokens, each schema token may be referred to as "<col_n_k>", where n corresponds to a column identifier and k specifies the number of the token within the list of created column tokens. The schema tokens 226 may be comprised of the "<col_n_k>" tokens, separated by separator tokens 225 (e.g., [SEP]).

The token type ids which may be part of an input to an ALBERT model may be chosen to be set to '0' for the initial [CLS] token and all utterance tokens 224, and '1' for all other tokens. This may inform the ALBERT model that the utterance tokens 224 are distinct from the other tokens. The ALBERT output of the initial [CLS] token 221 may provide an overall representation of the tokenized utterance-schema pair. In some embodiments, a hidden layer 260 may then be applied to the outputs of the [CLS] token 221.

In some embodiments, a linear layer 270 may then be applied to the output of the hidden layer 260 to create a logit. The dimension of the linear layer may be <dimension of hidden layer 270>x1. This logit may represent a score of the utterance-schema pair.

In some embodiments, based on the input tokens (i.e. utterance-schema pair information), the combination of the ALBERT model 250, the hidden layer 260, and the linear layer 270 may generate N logits corresponding to the N utterance-schema pairs. The softmax layer 280 may receive resulting N logits from the N topic/step options and may generate the probabilities for each topic/step to hold the answer for the utterance 114. The topic/step with the largest probability may be chosen by the model 200 to determine the effective schema.

In some embodiments, a Bidirectional Encoder Representations from Transformers (BERT) model may be used in place of the ALBERT model 250. The ALBERT model 250 may be trained using a number (e.g., 1000's) of examples (e.g., machine-generated examples) as to be described herein.

Translation Layer—Encoder

In some embodiments, as described herein, the translation module 130 may include a translation layer 136. To translate an utterance in the schema context as identified in the action identification layer 134 to an intermediate SQL statement, the translation layer 136 may use an encoder/decoder-like framework. The utterance 114 (and other relevant information like columns and SQL keywords) may be encoded into a set of vectors by an encoder of the translation module 130. The intermediate SQL statement may then be generated by a decoder of the translation module 130 based on the encoded vectors.

Figure 3:
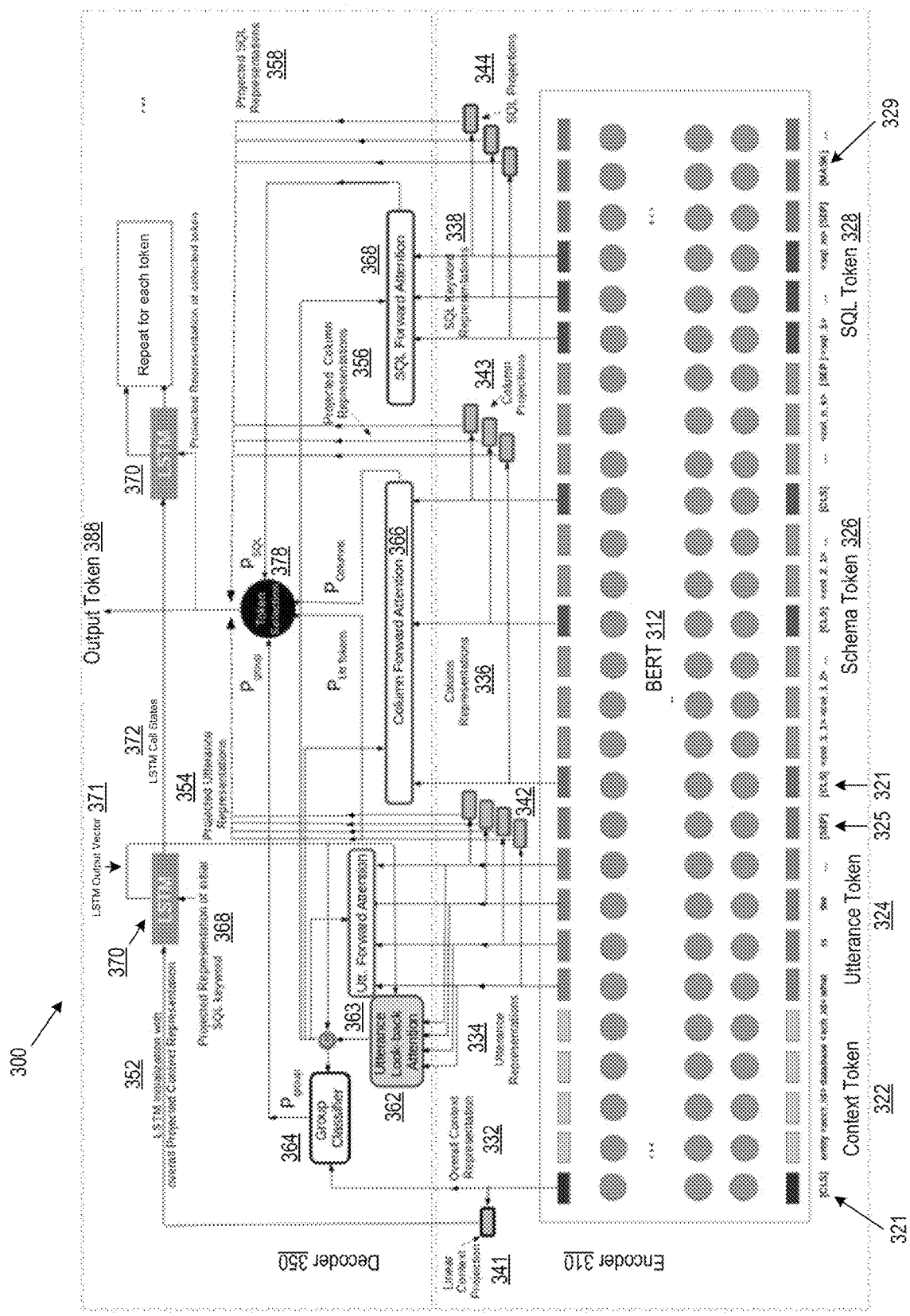
FIG. 3 illustrates an exemplary translation layer comprising an exemplary encoder and an exemplary decoder, according to some embodiments.

FIG. 3 illustrates an exemplary translation layer 300 comprising an exemplary encoder 310 and an exemplary decoder 350, according to some embodiments. In some embodiments, a first layer of the encoder 310 may be based on Bidirectional Encoder Representations from Transformers (BERT), as described by "BERT: Pre-training of Deep Bidirectional Transformers for Language Understanding". In other cases, the first layer of the encoder 310 may be based on techniques and approaches somewhat similar to BERT, like DistilBERT, T5 or Tapas, or their underlying architectures.

The encoder 310 may tokenize NL inputs (e.g., an utterance 114) using the tokenizer of the BERT model 312 to generate the input tokens. In some cases, the input to the BERT tokenizer 312 may include the utterance, the schema columns from the identified schema context (or their model names as specified in the schema encoding), and possibly the SQL keywords from the intermediate SQL token list (see discussion below). The input may also contain additional information that may help the translation 136 to do a more accurate translation specific to a customer, database type, or other.

In some embodiments, a sample tokenized input may include:
- The standard BERT [CLS] starting token (321)
- Tokenization 322 of contextual information, which may in some embodiments include a string of the form 'entity <acct_id> database <sch_id>', where <acct_id> may be a numerical identifier of the customer and <sch_id> may be a numerical identifier of the database schema.
- Tokenization 324 of the utterance, followed by a separator token [SEP] (325) which may indicate separation of token categories
- Tokenization 326 of model column names (see: 'schema encoding') of the effective schema (i.e., the columns in the chosen topic or the columns of the target result set). Each tokenized model name may be preceded by another [CLS] token. (In FIG. 3, <col_n_k> refers to the k-th token of the n-th column name, as each column name may produce more than one token when it is tokenized. As an example, an actual column 'accounts.registered_name' which may be associated in the schema encoding with the model name 'account name', may then be tokenized as [CLS], 'account', 'name'.
- A [SEP] token separating signaling the end of the column section
- Tokenizations 328 of all intermediate SQL keywords in the intermediate SQL list, followed by a final [SEP] token which may again signal the end of a section of tokens.
- A number of padding tokens [PAD] (329) to fill the sequence to ensure equal length of all inputs. For example, if the configured standardized length of input tokens is 100, but there are only 60 input tokens used so far, 40 [PAD] tokens 329 can be added to the end of the existing input tokens, such that there are 100 input tokens in total.

BERT may produce context-based output representations for each input token Specifically, there may be representations for:
- the initial [CLS] token (332)
- each utterance token (334)
- each [CLS] token associated with a column (336)
- each intermediate SQL keyword (338)

Additionally, the Encoder 310 may produce lower-dimensional representations for those tokens which in some embodiments may be the results of multiplying the full representations by matrices with the dimensions that are suitable for the decoder. For example, the dimensional reduced representation (352) of the initial [CLS] token may be obtained by multiplying representation 332 with a matrix $W_{CLS}$ 341.

the dimensional reduced representation (354) of each utterance token may be obtained by multiplying representation 334 with a matrix $W_{utterance}$ 342 the dimensional reduced representation (356) of each [CLS] token associated with a column may be obtained by multiplying representation 336 with a matrix $W_{columns}$ 343 the dimensional reduced representation (358) of each intermediate SQL keyword may be obtained by multiplying representation 338 with a matrix $W_{SQL}$ 344

In some embodiments, 'bert-base-uncased' may be used as the pre-trained embedding model and the dimension of the representation vectors 332, 334, 336, and 338 may be 768*d*.

In some embodiments, each of the matrices $W_{CLS}$, $W_{utterance}$, $W_{columns}$, and $W_{SQL}$ may have the same dimensions, as their primary purpose may be to produce representations of a suitable dimension for the Decoder 350. (A secondary purpose may be to transform the representations 332, 334, 336, and 338 differently for each of those four types.) In some cases these matrices may have dimensions of 768×200.

Translation Layer—Decoder

In some embodiments, the decoder 350 may include a neural network (e.g., a recurrent neural network). The neural network may include long-short-term memory (LSTM) architecture 370 with one or more layers. Using the neural network, the decoder 350 may predict (e.g., iteratively predict) one or more intermediate SQL output tokens 388 that form an intermediate SQL statement.

Before predicting the first intermediate SQL output token 388, the LSTM architecture 370 may be initialized with the projected context representation 352 for the initial cell state 372. The first input to the LSTM cell 370 could be the dimensionally reduced embedding of a 'start' token, which could be part of the Intermediate SQL keyword set (See below). In some embodiments, this start token may be represented through an unused BERT token, e.g., [unused99].

In some embodiments, the prediction of the respective next intermediate SQL output token may be implemented as follows:

With the hidden LSTM state from the previous output token prediction step (or, for the first output token prediction step, with the initialization above) and the dimensionally reduced representation of the previously predicted SQL output token (or, for the first prediction step, the suitable representation of the 'start' token) as input, the LSTM architecture 370 may generate at a given output step an output vector 371. An utterance look-back attention module 362 (as shown in FIG. 3) may then be implemented that uses the output vector 371 and the utterance representations 334 to generate an attention vector and one or more attention weights. For example, the attention vector and attention weight(s) may be generated using a standard dot-product attention calculation between the output vector 371 and the utterance representations 334. The purpose of the utterance look-back attention module 362 may be to provide additional contextual information regarding what part of the utterance may be most relevant for the current prediction step. In some embodiments, a group classifier 364, utterance forward attention module 363, column forward attention module 366, and SQL forward attention module 368 may model the likelihood $p_{group}$ of a specific token group for the predicted token (e.g., utterance token, column token, or intermediate SQL keyword token), and ii) the likelihoods $p_{utt-forward}$, $p_{columns-forward}$, and $p_{SQL-forward}$ (collectively referred to as $p_{token-within-group}$) which token within the respective token group may be the correct one. The final token prediction may then be based on which token has the highest overall likelihood amongst the token probabilities p(token) calculated as:

$$p(\text{token}) = p_{group} * p_{token-within-group}$$

As an example, should the group classifier 364 predict that the correct token has a 75% chance to be a token referring to a column and the classifier for the column selection would predict that within the columns the third column has a chance of 80% to be the correct one, then the overall likelihood that the 3rd column is the correct next SQL output token is $$p(\text{3rd-column}) = p_{group}(\text{'columns'}) * p_{columns-forward}(\text{3rd-column}) = 75\% * 80\% = 60\%$$

In some embodiments, the three 'forward-attention modules', 363, 366, and 368, that make the predictions of individual token likelihoods within each of the three respective token groups may be implemented as follows: the concatenation of the attention vector from the utterance look-back attention model and the LSTM output vector 371 may be used for a standard dot product attention calculation now with respect to the representations of the tokens in the class, where the calculated attention weights for each token correspond to its predicted probabilities. In some cases, the concatenated vector may be multiplied by matrices $W_{utt-forward}$, $W_{columns-forward}$, or $W_{SQL-forward}$ respectively to match the dimension of the respective token representations. (The elements of these matrices are trainable parameters.)

In some embodiments, the group classifier 364 may be modeled as a very similar attention calculation as outlined above, where the vector resulting from the concatenation of the attention vector from the utterance look-back attention module 362 and the LSTM output vector 371 may attend over three separate projections of the context representation 332. The resulting three attention weights may be interpreted as the three group probabilities. (All weights used in matrices in this section may be trained during the translation model training.)

In some embodiments, the intermediate SQL statement may be generated by following the above procedure that generates the intermediate SQL output tokens one by one, each time choosing from either an utterance token, a schema column, or intermediate SQL keyword described below. A beam-search approach may be used in some embodiments.

Intermediate SQL

In some embodiments, intermediate SQL as described herein may be a universal (or near universal), intermediate SQL format that may extend the standard SQL grammar to align with data conversations. In some cases, intermediate SQL may be database agnostic. In some cases, intermediate SQL may encode one or more actions, where an action may not directly correspond to a standard SQL function or keyword. The action(s) indicated in an utterance and encoded in the intermediate SQL statement may be translated into executable SQL statements during a post-processing operation 138 as to be described herein.

The extensions of the SQL grammar incorporated in the intermediate SQL language (also referred to as 'higher-level actions') may in some cases fall into two categories: (i)

utterances that reference one or more previous conversation steps (e.g., previous steps 111a and 111b) of a data conversation (e.g., data conversation 110), and (ii) utterances that may be easy to verbalize but that do not correspond to simple standard SQL grammar keywords. For example, intermediate SQL keywords of the first type may include "combine" or "exclude" which could translate to executable SQL containing joins of various types of previous result sets.

Keywords for the second type may include the terms "Growth", or "Ratio". For example, 'Growth' may be part of an intermediate SQL statement that returns the year-over-year growth of a quantity. A non-exhaustive list of possible additional keywords with their purpose is described below in Table 1. The keywords may be defined such that user intent indicated in an utterance may be converted into relatively compact intermediate SQL structures by the translation layer 136 which are then converted into potentially complex executable SQL statement by the post-processing layer 138. This allows the data conversation system 101 to process a broad range of NL queries included in utterances and allow for reference to previous steps of a data conversation. As an example, utterances such as "What are the month over month growth in sales?" and "Show me the top 3 customers for each state ranked by sales" appear simplistic, but they may result in complex SQL statements that can involve use of Common Table Expressions as to be described herein. In some embodiments, as described herein, intermediate SQL may include one or more keywords (e.g., included in an utterance) extending standard SQL keywords. Table 1 as follows includes example keywords, actions, example utterances, and example intermediate SQL encodings generated by the translation layer 136.

TABLE 1

Example Intermediate SQL Mappings Related to Higher-Level Actions

| Intermediate SQL Keyword | Action | Utterance Example | Intermediate SQL Encoding Example |
|---|---|---|---|
| combine | inner join on referenced steps on identically-named columns | "show me everything from Step 1 that is also in Step 2" | SELECT COMBINE(1, 2) |
| step | reference a previous step for filtering purposes | "what is the total amount for each account in step 1" | SELECT accounts.id, SUM(opportunities.amount) WHERE accounts.id IN STEP 1 |
| exclude | left join on referenced steps on identically-named columns where join values for right step are all null | "show all rows from Step 5 that are not in Step 7" | SELECT EXCLUDE(5, 7) |
| year/month/day/hour, . . . | extracting a time group | "show the total amount by year of close" | SELECT YEAR(opportunities.create_date), SUM(opportunities.amount) |
| percent | Percentile calculation | "what is the 30 percentile of won amounts per region" | SELECT PERCENT(opportunities.amount 30 PARTITION accounts.region) WHERE opportunities.stage = 'won' |
| growth | Growth calculations | "what is the yearly growth of won amount per region" | SELECT GROWTH(SUM(opportunities.amount), YEAR(opportunities.close_date) PARTITION accounts.region) WHERE opportunities.stage = 'won' |
| rank | Ranking calculations with partitioning | "what are the top 10 reps by total won amount per year" | SELECT accounts.account_executive, RANK(SUM(opportunities.amount) DESC PARTITION YEAR(opportunities.close_date)) WHERE opportunities.stage = 'won' |
| ratio | Ratio calculation, relating a calculation with a where condition to same calculation without that condition | "what fraction of opportunities in each region are won" | SELECT accounts.region, COUNT(opportunities.id) WHERE RATIO opportunities.stage = 'won' |

TABLE 1-continued

Example Intermediate SQL Mappings Related to Higher-Level Actions

| Intermediate SQL Keyword | Action | Utterance Example | Intermediate SQL Encoding Example |
|---|---|---|---|
| pivot | Pivoting a table | "using step 3 compare <pivot column> <comma-separated list of values to compare> for each <comma-separated list of columns to keep> by <column of values to display>" | None. Hard-coded. |
| partition | Partitions functions | see Rank | see Rank |
| difference/ unit | calculate differences between consecutive rows | "for stage 6 opportunities, how many days are between ordered close dates for each customer" | SELECT DIFFERENCE(opportunities.close_date PARTITION accounts.account_name ORDER opportunities.close_date UNIT DAY) WHERE opportunities.stage = '6' |
| add | add a new column to an existing result set, referencing the column to join on | "add the sector for each account in step 18" | SELECT accounts.id, accounts.sector ADD STEP 18 |
| drop | drop a column | "drop stage from step 4" | SELECT DROP(stage) |
| call | rename columns | "rename sum_amount to amount in Step 3" | SELECT CALL(sum_amount, amount) |
| [unused99] | start token (auxiliary) | [This token is introduced automatically at the beginning of the Decoder input.] | n/a |
| [unused101] | end token (auxiliary) | [This token is introduced automatically at the beginning of the Decoder input.] | n/a |

As described above, an intermediate SQL Keyword (i.e. grammar extension) may correspond to a keyword or phrase that may be referred to in an utterance 114. In some cases, to align more with the pre-training tasks of pre-trained language models like BERT, it may be useful to replace some intermediate SQL keywords with more natural language terms. As an example, the following SQL keywords may be encoded as a corresponding NL word: DESC—descending, ASC—ascending, AVG—average. Additional encodings may occur for other standard SQL tokens. The post-processing layer 138 described herein may then re-insert the proper SQL keywords as needed.

Another advantage of the intermediate SQL formalism is that it is extremely compact and descriptive, hence they are easily expressed in language. In some embodiments, this may be used to provide the virtual assistant 140 with a compact explanation of the executed SQL.

Post-Processing Layer

In some embodiments, as described herein, the translation module 130 may include a post-processing layer 138. The post-processing layer 138 may convert the intermediate SQL statement from the translation layer 136 to an executable SQL statement that can be executed against a database schema. The tasks that the post-processing layer 138 may perform may include:

- insertion of 'FROM' and 'JOIN', if the intermediate SQL layer did not generate them.
- conversion of intermediate SQL keywords that do not directly correspond to a standard SQL token
- additional post-processing substitutions
- inserting additional select columns for existing select columns if configured in schema encoding In some cases, the post-processing layer 138 may reconstruct and insert one or more from/joins clauses. In some embodiments, this may be accomplished by the post-processing layer 138 by first deriving the tables required that contain the columns indicated in the intermediate SQL statement. Using those tables and the pre-configured join statement in the schema encoding, the post-processing layer 138 may construct the FROM/JOIN clause and insert it in the SQL statement.

In some cases, in the post-processing layer 138, a group-by clause may be reconstructed. This can be achieved by analyzing the use of aggregated and non-aggregated columns in the SQL statement. In some implementations this can be achieved by 1) determining whether there are any aggregations in the SQL statement, if so 2) add a GROUP-BY clause for any non-aggregated column in SELECT and WHERE clauses.

In some embodiments, the post-processing layer 138 may execute one or more substitutions as defined in the schema encoding. As an example, the post-processing layer 138 may convert a clause such as "WHERE <column>= . . . " to "WHERE <column> LIKE . . . " based on the "<column>" being specified (e.g., in a schema configuration) to be used with "LIKE".

In some embodiments, it may be beneficial to display specific columns along with other columns (e.g., even if they were not explicitly requested). As an example, an account name should always be shown if an account id is selected. In some cases, the post-processing layer 138 may analyze the columns that are in the select clause of a SQL statement and then consult the schema encoding to determine whether another column should be added to the SELECT clause.

In some cases, in the post-processing layer 138, "DISTINCT" operations may be used to avoid counting key values more than once. See the "Schema Encoding" section for additional comments.

In some embodiments, converting intermediate SQL statements with the intermediate SQL keyword extensions into executable SQL clauses may be accomplished by parsing the intermediate SQL statements and then constructing the appropriate clauses for the executable SQL statements. The schema encoding may be referenced for this construction. The complexity of the construction process may vary depending on the specific keyword used. For example, for some keywords that may extract time components of dates (e.g., 'Year', 'Month'), the construction may be straightforward and the only complexity may be in the proper conversion for a particular structured query language dialect. An example could be: Year(accounts.create_date)→LEFT(accounts.create_date, 4) where the column accounts.create_date was assumed to be in string format.

5) The post-processing layer 138 in some embodiments may:

i) identify the extended SQL keyword 'Drop' ii) use the columns of the effective schema to construct a SQL clause that selects all columns except for column 'stage' iii) combines the newly constructed clause with the executable SQL statement of step 3 to construct the executable SQL statement for step 4, which in some embodiments may be done using Common Table Expressions.

A number of intermediate SQL extension keyword conversions may follow a similar approach. Other types of SQL keyword extensions may create SQL window functions and/or may require nested SQL clauses (e.g. 'Growth'). In some cases, this may be accomplished by parsing the intermediate SQL statement, constructing a nested SQL structure, and inserting the components of the intermediate SQL statement related to the intermediate SQL keyword into the correct spots. In some cases, the utterance "what is the yearly growth of the total amount" may then in some embodiments create an intermediate SQL statement such as:

"SELECT GROWTH(SUM(opportunities.amount), YEAR (opportunities.close_date))" which may be converted in the post-processing layer 138 to the executable SQL statement:

```
WITH t_1 AS
(WITH t_0 AS
(SELECT LEFT(opportunities.close_date, 4) AS year_close_date,
   SUM(opportunities.amount) AS sum_amount
   FROM opportunities
   GROUP BY LEFT(opportunities.close_date, 4))
   SELECT *, lag(sum_amount, 1) OVER( ORDER BY year_close_date) AS
last_sum_amount
   FROM t_0)
   SELECT *,
   ROUND(100 * (CAST(sum_amount AS NUMERIC)/ last_sum_amount − 1), 3) AS
sum_amount_growth
   FROM t_1
```

In other cases, the executable SQL construction may be more complex. Consider, for example, the case of 'Drop'. The overall flow for a specific example may be:

1) assume that step 3 contains a result set with a number of columns, including a column named 'stage'

2) the new utterance in step 4 is "remove stage in step 3"

3) the effective schema identification layer 134 may identify the result set of step 3 as the correct target for the intermediate SQL and constructs a temporary effective schema which may be based on the column names of the result set of step 3

4) The translation layer 136 may in some embodiments translate the utterance for the effective schema to the following intermediate SQL statement: "SELECT DROP (stage)"

As another more complex example, for an utterance that may result in the use of the intermediate SQL extension keyword 'RATIO', the post-processing layer 138 may execute the following conversion from an intermediate SQL statement to an executable SQL statement:

Sample Natural Language Question:

"what is the fraction of opportunities created last year that were won for each account"

Intermediate SQL Statement:

```
SELECT accounts.id, COUNT(opportunities.id)
WHERE YEAR(opportunities.create_date) =
   YEAR(NOW MINUS INTERVAL 1 YEAR) AND
RATIO opportunities.stage ='won'
```

Executable SQL Statement:

```
SELECT accounts.id AS account_id, accounts.account_name AS account_name,
LEFT(opportunities.create_date, 4) AS year_create_date,
COUNT(opportunities.id) AS count_opportunity_id,
COUNT(CASE
WHEN opportunities.stage ILIKE '%won%' THEN opportunities.id ELSE NULL
END) AS filter_count_opportunity_id,
(COUNT(CASE
WHEN opportunities.stage ILIKE '%won%' THEN opportunities.id
   ELSE NULL END)::FLOAT)/COUNT(opportunities.id) AS
```

```
ratio_count_opportunity_id
  FROM opportunities
  JOIN accounts on accounts.id = opportunities.account_id
  WHERE opportunities.create_date IS NOT NULL
  AND LEFT(opportunities.create_date, 4) =
  LEFT(to_char(NOW( ) - INTERVAL '1 YEAR', 'YYYY'), 4)
  GROUP BY LEFT(opportunities.create_date, 4), accounts.id,
      accounts.account_name
```

It is readily apparent that the intermediate SQL statement is much simpler, easier to describe and verify, and easier to learn for any model.

Lastly, another explicit example illustrating the reference to an earlier result set in the conversation history 116 could be:

Submitted Utterance:

```
"What is the average amount per region in Step 3"
    - Intermediate SQL Statement:
    SELECT region, AVERAGE(sum_amount)
    - Executable SQL Statement:
    WITH t0 AS (<executable SQL statement of Step 3>)
    SELECT region AS region, AVG(sum_amount) as avg_sum_amount
    FROM t0
    GROUP BY region
where the result set of Step 3 was assumed to contain columns named 'region' and 'sum_amount'.
```

Model Training

In some embodiments, if for example the translation layer 136 of the translation module 130 is based on a machine learning/neural net architecture, the translation layer 136 may need to be trained. The translation layer 136 may be trained using one or more training datasets. Training examples may be pairs of a natural language question and matching intermediate SQL statements, combined with additional meta-data. An example could be:

```
- Natural Language Question:
"how many won opportunities were created for each account last year")
    - Intermediate SQL Statement:
SELECT account.id, COUNT(opportunities.id)
    WHERE YEAR(opportunities.create_date) =
(NOW MINUS INTERVAL 1 YEAR)
AND opportunities.stage ='won'
- the underlying schema column structure
- the topic if applicable, i.e. the pre-defined subset of tables and columns that contain all of
the columns involved in the intermediate SQL query.
```

Note that in some embodiments, the intermediate SQL statements may not need to include any components which can be re-inserted during the post-processing phase. Examples could be the FROM/JOIN phrase, as these can be inferred from the used columns in the statement and the join conditions pre-defined in the schema encoding, or GROUP BY components which can be reconstructed from used aggregated and non-aggregated columns.

In some cases, a training dataset may contain public data sets, like the WikiSQL dataset as described in "SEQ2SQL: GENERATING STRUCTURED QUERIES FROM NATURAL LANGUAGE USING REINFORCEMENT LEARNING". The data in these datasets may need to be transformed into a format that is suitable for the translation layer 136.

In some cases, a training data set may include a custom dataset that focuses on one or more specific schemas of interest and/or emphasizes intermediate SQL expressions that may be absent from the WikiSQL dataset as described herein. Examples of the latter could include intermediate SQL statements that use one or more of the first four keywords in Table 1.

To generate custom training examples at scale, it may be useful to auto-generate them from one or more parameterized language/intermediate SQL pairs. An example-generating script may then iterate over these pairs and information in the schema encoding (or elsewhere) substitute the parameters with actual values, columns, etc. This may result in one or more artificial utterance-intermediate SQL pairs that may augment one or more training examples.

The overall training set may comprise tens of thousands of training examples. In some embodiments, the training phases may also be split up where in an initial phase the translation model 136 is trained on a broad set and then fine-tuned on a smaller set with custom examples that are more specific to the problem of interest.

In the BERT-based encoder/decoder architecture discussed herein that implements the translation layer 136, parameters (e.g., all parameters) in the pre-trained BERT model 312 in the encoder 310 may be re-trained, and other parameters (e.g., all other parameters), including those in the referenced W matrices and those in the LSTM cells 370, may be trained from random initializations.

In some embodiments, the selection model 200 of the effective schema identification layer 134 may need to be trained. The selection model 200 may be trained based on the training dataset described above where the topic is the prediction variable. In some cases, follow-up questions may supplement the training dataset as a part of training. The follow-up questions may be automatically generated based on parameterized language patterns that include parameters for column expressions. The follow-up questions may be applied to the topics in the schemas or to results sets (e.g., from previous steps), where the questions may be cycled through the respective columns. In some cases, the column structures resulting from the custom-generated training dataset as described herein may be used to generate the column names of possible result sets. Accordingly, the selection module 200 may learn to evaluate the overlap between the question and the column names of the topics and referenced steps in an utterance.

User Interface

Figure 4:
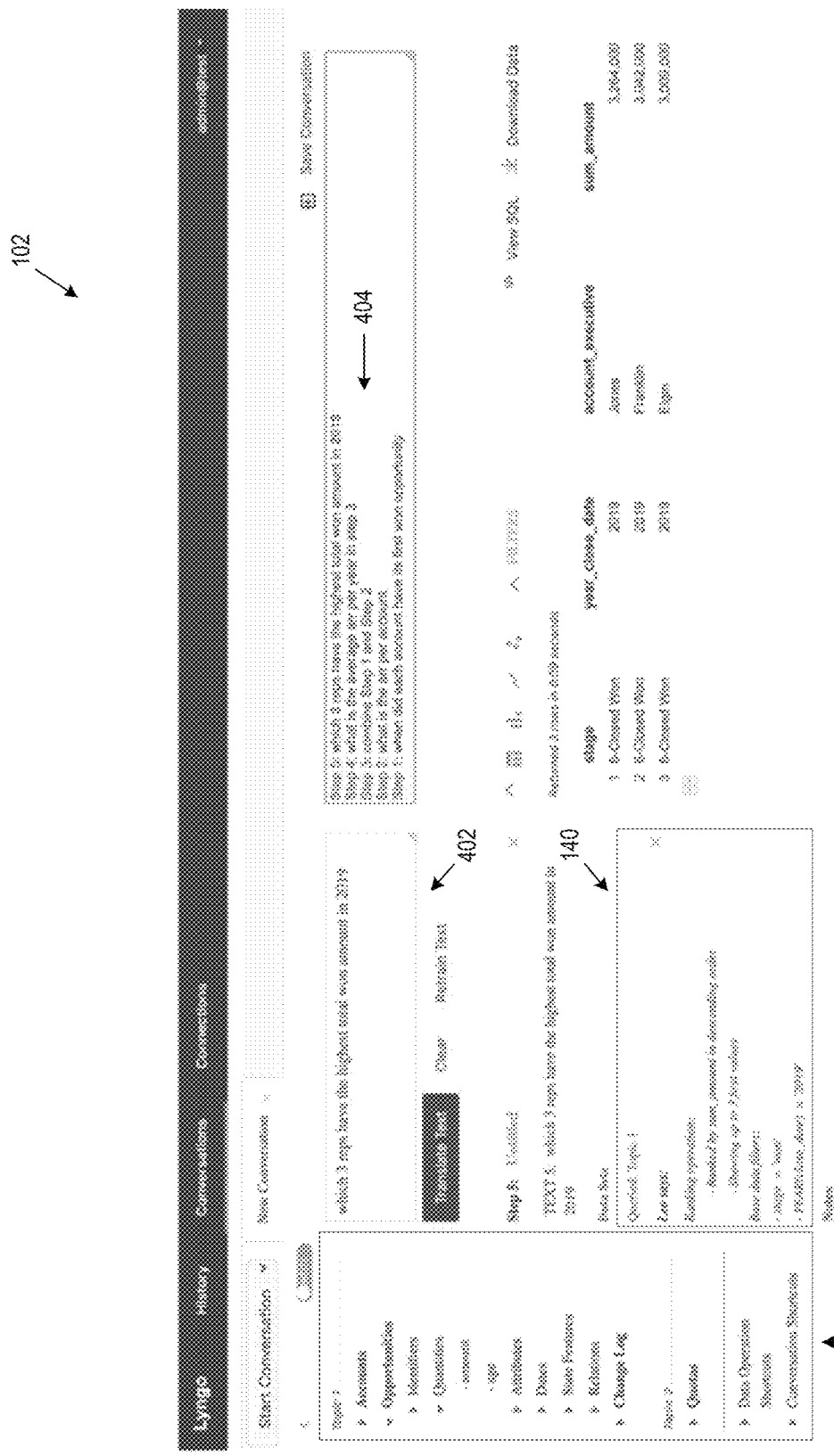
FIG. 4 illustrates an exemplary user interface of an exemplary data conversation system, according to some embodiments.

In some embodiments, as described herein, the data conversation system 101 may include a user interface 102. FIG. 4 illustrates an exemplary user interface 102 of an exemplary data conversation system 101, according to some embodiments. In some cases, the user interface 102 may be displayed via a web browser operating a computing device. In some cases, the user interface may include a topic view 406 including one or more characteristics as described herein. In some cases, the user interface 102 may include an input region 402. A user may input an utterance at the input region 402 using an input device (e.g., keyboard). In some cases, the user interface 102 may include a navigable conversation history window 404. The conversation history window 404 may show one or more data conversations, including past and/or present data conversations that each include one or more queries. In an example, as shown in FIG. 4, the conversation history window 404 may show Steps 1-6 of a data conversation 110, where Steps 1-6 each include an utterance or a SQL query. In some cases, as described herein, the user interface 102 may display a virtual assistant 140. The virtual assistant 140 may display: the data set(s) or topics queried by a SQL statement; the confidence level of the NL translation; an explanation of the translated SQL statement in understandable terms (e.g., to a non-technical user) to validate satisfaction of user intent; additional post-processing steps that were taken to process the intermediate SQL statement; data filters used to execute the SQL query. In an example, as shown in FIG. 4, the virtual assistant 140 may display a queried topic "Topic 1", a description of the ranking operation that was executed, and a listing of the data filters used in the SQL statement translation and execution.

General Comments

Measurements, sizes, amounts, etc. may be presented herein in a range format. The description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as 10-20 inches should be considered to have specifically disclosed subranges such as 10-11 inches, 10-12 inches, 10-13 inches, 10-14 inches, 11-12 inches, 11-13 inches, etc.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device may be implemented in a distributed way over a network, for example as a server farm or a set of widely distributed servers, or may be implemented in a single computing device.

Although an example processing system has been described, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method, comprising:
    receiving, by a user interface, an utterance directed to querying a data query engine;
    identifying one or more previous steps of a data conversation that are indicated by the utterance, wherein the one or more previous steps were previously received by the user interface before a step having the utterance;
    determining, by a machine learning model and based on the utterance and the one or more previous steps, an effective schema targeted by the utterance, wherein (i) the machine learning model determines the effective schema by selecting a topic comprising one or more schema objects of a plurality of schema objects of the data query engine, and (ii) the effective schema comprises the one or more schema objects;
    generating, based on the utterance and the effective schema, an intermediate structured query language statement that is representative of the utterance;
    generating an executable structured query language statement based on the intermediate structured query language statement, wherein the executable structured query language statement is comprised of a query language dialect of the data query engine;
    executing the executable structured query language statement for the data query engine; and
    communicating, via the user interface, a result set and metadata, wherein the result set and the metadata correspond to the execution of the executable structured query language statement.

2. The method of claim 1, wherein the user interface displays holistic views of one or more data conversations comprising the data conversation.

3. The method of claim 1, wherein the user interface displays detailed views of one or more data conversations comprising the data conversation.

4. The method of claim 1, wherein the user interface displays a schema view of the data query engine indicative of at least some of the plurality of schema objects stored by the data query engine.

5. The method of claim 1, further comprising:
    extracting one or more calculations and one or more metric names indicated by the utterance; and
    encoding the one or more calculations and the one or more metric names in the effective schema.

6. The method of claim 1, wherein the user interface displays a topic view comprising the topic, wherein the topic comprises one or more entities corresponding to the one or more schema objects, wherein each entity of the one or more entities comprises one or more queryable attributes.

7. The method of claim 6, further comprising:
    causing display, via the user interface, of the topic, the entities, and the queryable attributes, wherein the topic, the entities, and the queryable attributes are (i) logically categorized based on a usage and (ii) represented in natural language terms.

8. The method of claim 1, wherein (i) the machine learning model determines the effective schema by selecting one or more previous result sets generated based on the one or more previous steps of the data conversation, (ii) each of the previous result sets corresponds to a respective previous step of the previous steps, and (iii) the effective schema comprises the one or more previous result sets.

9. The method of claim 1, wherein the intermediate structured query language statement:
   (i) indicates an intent of the utterance in an expression, wherein the expression indicates a functionality of the executable structured query language statement; and
   (ii) is generated from a set of intermediate SQL keywords, metadata of the effective schema, and zero or more utterance tokens.

10. The method of claim 1, further comprising:
expanding standard SQL keywords to include one or more user intent keywords that manipulate or relate the one or more previous steps of the data conversation.

11. The method of claim 1, further comprising:
generating the executable structured query language statement based on the intermediate structured query language statement and one or more previous executable structured query language statements corresponding to the one or more previous steps of the data conversation.

12. The method of claim 1, further comprising:
converting the utterance directly to the executable structured query language statement based on one or more user intent keywords or key phrases included in the utterance.

13. The method of claim 1, further comprising:
causing communication of, via the user interface, an indication of one or more of: the executable structured query language statement, a confidence level of a translation of the utterance to the executable structured query language statement, the result set, and zero or more query filters.

14. The method of claim 1, further comprising:
causing communication of, via the user interface, a natural language explanation of actions performed by the executable structured query language statement.

15. The method of claim 1, further comprising:
communicating, from the user interface accessed by a first computing device to a second user interface accessed by a second computing device, views of one or more data conversations comprising the data conversation.

16. The method of claim 1, wherein the user interface is configured to:
   (i) receive a save input configured to store one or more data conversations comprising the data conversation;
   (ii) receive a replay input configured to replay at least part of the one or more data conversations comprising the data conversation;
   (iii) for each step of the data conversation, display the result set and the metadata; and
   (iv) for each step of the data conversation, comprise one or more of: graphing options for the result set, data filters for the result set, a table view for the result set, table sorting for the result set, a naming capability, an annotation capability, and a deletion capability.

17. The method of claim 1, further comprising:
causing display, via the user interface, of one or more schema columns with one or more related schema columns in the result set.

18. The method of claim 1, further comprising:
usage of zero or more schema columns to always appear with 'LIKE'-type comparisons in WHERE-clauses in the executable structured query language statement.

19. The method of claim 1, further comprising:
substituting one or more words included in the utterance for one or more alternate words.

20. The method of claim 1, wherein the user interface is configured to display the result set in a spreadsheet view.

* * * * *